May 13, 1941.  E. K. HUNT  2,242,073
UPHOLSTERY
Filed Dec. 16, 1936   2 Sheets-Sheet 1

INVENTOR.
Ernest Klopfer Hunt
BY Frank Tooley Jr
ATTORNEY.

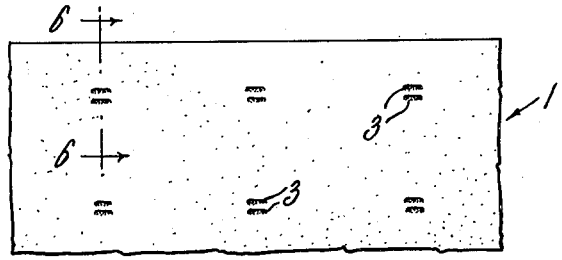
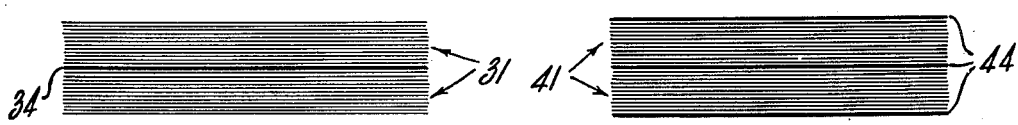
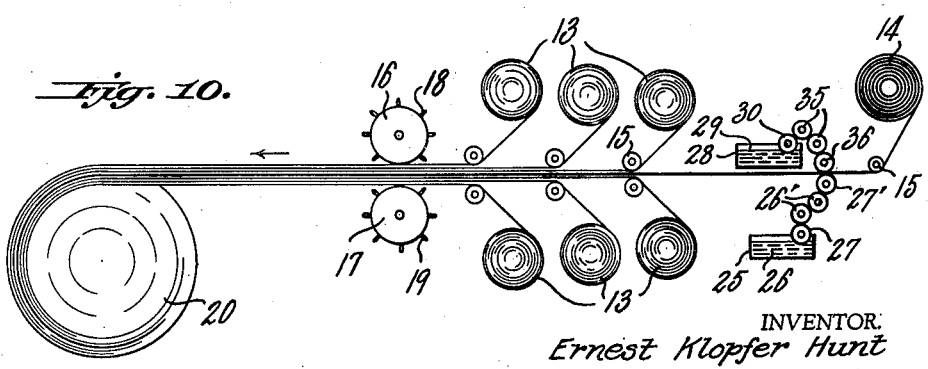

Patented May 13, 1941

2,242,073

UNITED STATES PATENT OFFICE 2,242,073

UPHOLSTERY

Ernest Klopfer Hunt, Jackson Heights, N. Y., assignor, by mesne assignments, to International Tissue Corp., New York, N. Y., a corporation of New York Application December 16, 1936, Serial No. 116,135

2 Claims. (Cl. 154—45.9)

My present invention relates to upholstery construction and, more particularly, to the manufacture of upholstered units adapted for use in the manufacture of automobile bodies, upholstered furniture and the like.

In the fabrication of upholstered panels of the type commonly used in vehicles, it has been proposed to pad boards of suitable material with a laminated sheet cellulosic material. The laminated sheet cellulosic material, after being cut to the size of the board, is secured thereto by the use of adhesive. The padded board is then covered with cloth or other textile material of the desired finish.

Difficulty has been encountered in the fabrication of upholstering panels in this manner when the cutting of the laminated sheet cellulose to the size of the board or panel member is attempted.

In practice, the panel members are cut to size by a die-cutting process. The textile covering material is cut to size by conventional methods. In the case of the padding material, large sheets of the laminated structure are laid out on a table, templets of the desired size and shape are laid on them and a cutter is run around the edges of the templet. Due to the resiliency of the creped cellulosic material, there is a tendency, when the templet is removed, for the material to spring to an over-all size smaller than that of the templet. The present invention contemplates overcoming this difficulty by securing the laminated structure to a relatively inextensible backing sheet. When this is done, the lower plies of the laminated structure are prevented from stretching and springing and the tendency of the uppermost plies to stretch and spring back is considerably restrained. As a result, the laminated structure can be much more certainly and expeditiously handled throughout the cutting process.

The difficulty above outlined is not overcome merely by the use of over-sized templets. In the first place, the tendency to stretch is enormously greater in a direction transverse to the creping than it is in the direction parallel to the creping. Moreover, the precise amount of stretch is uncontrollable and undeterminable so that no templet can be laid out of such size and shape as to guarantee perfection in the finished article.

The assembly of upholstering panels comprising a board and a laminated sheet cellulose pad of the type heretofore available has resulted in the production of panels of irregular appearance and unsatisfactory as to the finish of the edges. The pads, after cutting, contract to varying extents to a size less than that of the board and, when they are applied to the boards, irregular stepped edges result. When the padded boards are covered with cloth, these stepped edges impart an undesirable appearance to the finished product. This undesirable appearance can be avoided only by slow, careful manipulation of the pad, drawing it up even with the edge of the board prior to securing the covering material thereover. Such work greatly increases the cost of the finished product.

The production of pads of uniform size and of the same size as the board or panel member is particularly desirable in that edges of uniform appearance may be obtained in the finished upholstering panels.

Accordingly, an object of my invention is to so construct the material for upholstering pads that the size of pads cut therefrom may be accurately controlled.

Another object of my invention is to so construct material for upholstering pads that the tendency of the individual layers thereof to contract after cutting will be effectively minimized.

A further object of my invention is to devise a method by which material for upholstering pads, having the desirable features set forth above, may be produced.

My invention has, for further objects, such additional improvements, advantages of use and improvements in method of production as may hereinafter be found to obtain.

More particularly, my invention contemplates the introduction of a layer or layers of substantially inextensible material, such as paper, into a laminated upholstering pad. In its preferred form, my invention contemplates the introduction of such inextensible layer on that side of the pad which is last contacted by a cutting device and which is ultimately secured to a board or panel member. Such material may be cut into pads of the exact size of the boards to which they are to be secured. There will be no contraction of the inextensible layer and its presence will substantially limit and control the contraction of the adjacent layers or sheets of cellulose.

In order that my invention may be clearly set forth and understood, I now describe with reference to the drawings accompanying and forming a part of this specification improved forms and manners in which my invention may be embodied, utilized and produced. In these drawings, Fig. 1 is an elevation of a fragment of padding material constructed according to one form of my invention;

Fig. 2 is a front view of a fragment of a completed upholstering panel incorporating a pad cut from my improved material; while

Fig. 5 is a plan view of a cellulose wadding adapted for use with my invention, particularly illustrating the means for securing the layers of sheet cellulose in assembled laminated relationship;

Fig. 6 is a section on line 6—6 of Fig. 5 and showing the means for securing all of the layers of one form of my improved material in assembled laminated relationship;

Fig. 7 is an elevation of a fragment of material constructed according to a modified form of my invention;

Fig. 8 illustrates a further modification;

Fig. 9 illustrates still another modification; and

Fig. 10 illustrates a method by which material constructed according to any form of my invention may be produced.

Similar reference numerals indicate similar parts in each of the several views of the drawings.

Figure 1:

Referring now to the drawings, 1 is an assembly of cellulose wadding comprising a plurality of individual sheets 2 of very light cellulosic material creped during manufacture by the well known process of "doctor blade creping." The individual sheets 2 are interconnected to form the laminated wad 1 as by crimping shown at 3 in Figs. 5 and 6.

Figure 4:
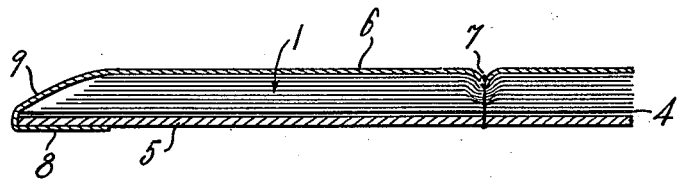
Fig. 4 is a section on line 4—4 of Figure 2 and showing the positions assumed by various layers of a pad cut from material constructed according to Fig. 1 when incorporated in a completed upholstering panel.

According to the preferred form of my invention, shown particularly in Figs. 1, 4 and 6, a backing sheet 4 of substantially inextensible material, such as ordinary paper, is secured by any suitable means, such as glue, to one outer surface of the cellulose wadding 1.

When padding material, thus constructed, is subjected to the action of a cutting device, there will result a substantial stretching of the layer 2 of sheet cellulosic material most remote from the backing sheet 4 and virtually no stretching of the backing sheet 4. The layers intermediate the outermost layer 2 and the backing sheet 4 will be stretched to diminishing extents as their respective locations approach the backing sheet 4.

Thus, it may be seen, that upholstering pads may be so cut from my improved material that the sides thereof bearing the backing sheet 4 will be of substantially uniform size well within the desired limits of exactness.

Figure 2:
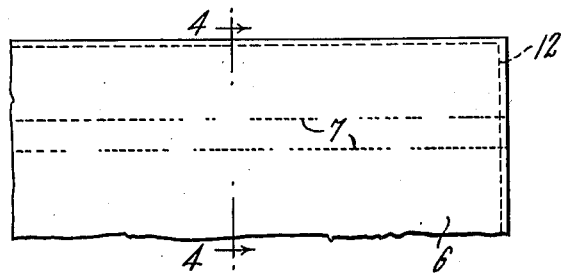
Figure 3:
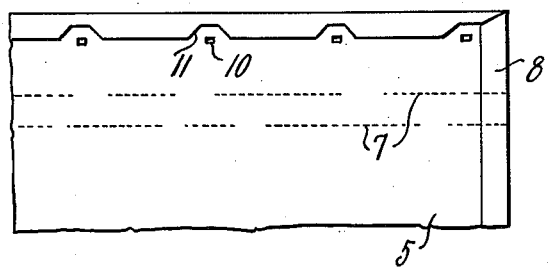
Fig. 3 is a rear view of the same.

One use to which pads cut from my improved material may be advantageously adapted is illustrated in Figs. 2, 3 and 4. In these figures, there is shown a fragment of an upholstering panel of the type commonly used on the interior of automobile doors and body sections.

A board or panel member 5, cut to desired size and shape, has secured thereto a pad cut from my improved padding material. This pad may be so cut that the side thereof bearing the backing sheet 4 is substantially of the exact size and shape of the board 5. Any desired manner of securing the pad to the board 5 may be availed of. As an example, the outside surface of the backing sheet 4 and a surface of the board 5 may be secured together by a layer of any desired adhesive material to form an assembled, padded panel.

The padded side of the assembled panel may be covered with cloth or other textile material 6 of any desired finish. If so desired, the panel may be stitched as at 7 to draw the cloth 6 toward the board 5 and locally compress the pad thereunder for the purpose of forming a smooth padded surface free from looseness and to overcome any tendency toward bulging. The lines of stitching 7 may follow any desired decorative pattern.

The cloth 6 is cut to a size larger than that of the padded panel and the marginal portions thereof are turned over the edges of the panel and secured to the back thereof as at 8 by any desired means.

As a result of the varying extents of stretch imparted to the layers 2 of the padding material in the process of cutting a pad therefrom, the edges of a cut pad will assume a beveled outline defined by the successively increasing contraction of the layers 2 as the respective locations thereof become increasingly remote from the backing sheet 4. The lines of stitching 7 will increase the tendency of the pad to assume this beveled outline at its edges. The turning of the cloth 6 over the edges of the padded panel will tend to place the outermost layers 2 under tension to stretch these layers to a certain extent. Thus, the final outline of the edges of the pad will constitute a concave bevel, substantially as shown in Fig. 4.

The portion 9 of the cloth 6 will assume a smoothly beveled outline, generally defined by the outline of the edges of the pad and board 5 respectively.

Thus a completed panel is produced whose edge outlines are accurately and satisfactorily controlled. In the production of a series of such panels, consistency of appearance and uniformity of edge outline may be obtained to a degree heretofore unknown.

Desirably, but not necessarily, the board 5 may be provided with apertures 10 for the reception of fastening devices which may be provided on the surface to which the completed panel is ultimately to be applied. If apertures 10 are to be provided and the location thereof should require, notches or openings 11 of any desired size or shape may be provided in the edges 8 of the cloth 6. The notches 11 are so disposed as to prevent the edges 8 of the cloth 6 from overlapping or otherwise interfering with the apertures 10.

Fig. 7 illustrates a modification of my improved padding material which may be particularly desirable in certain relationships. In this form of my invention, two layers 24 of substantially inextensible material, such as ordinary paper, are provided. One of said layers 24 is applied to an outer surface of the laminated assembly 21 of sheet cellulosic material. The laminated assembly 21 is split into two sections of any desired relative thickness and the other of said layers 24 is interposed between said two sections. The layers 24 are secured to the adjacent layers of sheet cellulosic material by any suitable means, such as glue.

In Fig. 8, I have shown another modification of my improved padding material. In this form of my invention, a layer 34 of substantially inextensible material, such as ordinary paper, is provided intermediate two assemblies 31 of laminated sheet cellulosic material. The assemblies 31 may be of any desired thickness relative to one another. The layer 34 is secured to the adjacent surfaces of the assemblies 31 by any suitable means, such as glue.

In Fig. 9, I have shown a further modification of my improved padding material. In this form of my invention, layers 44 of substantially inextensible material, such as ordinary paper, are applied to both outer surfaces of an assembly 41 of laminated sheet cellulosic material. Another layer 44 may be provided which serves to divide the assembly 41 into sections of any desired relative thickness. It is to be understood that all of said layers 44 are secured to the adjacent layers of sheet cellulosic material by any suitable means, such as glue.

In Fig. 10, I have disclosed diagrammatically a method by which padding material, having the features of any of the various forms of my invention may be fabricated. Any desired number of supply rolls 13 and 14 may be provided and may be supported in any suitable or convenient manner. The rolls 13 serve as a source of supply of webs of creped cellulosic material while one or more rolls, such as 14, serve as a source of supply of webs of substantially inextensible material, such as ordinary paper. Guide rollers 15 are supported in any suitable manner and are associated with each web supply roll 13 and 14. Crimping rollers 16 and 17, provided with indenting members 18 and 19 respectively, are supported in a suitable location and serve to secure the layers of cellulosic material in assembled laminated condition.

Any suitable means may be provided for the application of an adhesive to the surface or surfaces of the inextensible layer which will be in contact with a layer of cellulosic material. One such means is diagrammatically shown in Fig. 10. When it is desired to apply adhesive to the lower surface of the inextensible web, a container 25 is suitably supported beneath the web. A supply 26 of any suitable adhesive is maintained within the container 25. A dip roller 27 is mounted with a portion of its surface immersed in the adhesive 26. Contact rollers 26' are provided to conduct adhesive from the dip roller 27 to a roller 27' urged into contact with the web of inextensible material. The roller 27' is rotated by any suitable means at a peripheral speed suitable for the transfer of adhesive from the supply 26 to the lower surface of the web of inextensible material. When it is desired to apply adhesive to the upper surface of the inextensible web, a container 28 is supported above the web. A supply 29 of adhesive is maintained in the container 28. A dip roller 30 is partially immersed in the adhesive. Contact rollers 35 are provided to conduct adhesive from the dip roller 30 to an applying roller 36 which is urged into contact with the upper surface of the web of inextensible material. It is to be understood that the rollers 30, 35 and 36 are driven by any suitable means at a peripheral speed suitable for the transfer of a satisfactory amount of adhesive from the supply 29 to the upper surface of the web of inextensible material.

A take up roll 20 may be provided upon which the assembled padding material is adapted to be wound.

It will be understood from the foregoing description that the supply rolls 13, 14, guide rollers 15, crimping devices 16, 17 and adhesive applying means 27', 36, may be variously arranged to secure the fabrication of padding material constructed according to any form of my invention hereinbefore described. As shown in diagrammatic form in Fig. 10, the arrangement of elements is such that material of the form shown in Fig. 8 will be fabricated.

In the practice of my method, as many supply rolls 13 are provided as may be desired. The webs from the supply rolls are threaded over rollers 15 to be guided into superimposed paths. A web of inextensible material is supplied by roll 14 and this web is guided over a roller 15 and between the adhesive applying rollers 27' and 36. Adhesive material is applied to the upper and lower surfaces of the inextensible web and this web is guided into a path intermediate the paths of the cellulosic webs.

All of the webs are then conducted between the crimping rollers 16 and 17, which serve to crimp the webs of cellulosic material into laminated relationship and press the inner webs thereof into contact with the adhesive bearing surfaces of the inextensible web. The completed padding material is then wound upon the roll 20 and stored for future use.

Although in order to comply with statutory requirements I have illustrated and described specific embodiments of my invention, which I have found to be particularly practical, various modifications and improvements will be apparent to those skilled in the art and certain portions of my improvement may be used without others. Therefore, I do not wish my disclosure to be taken as limiting the scope of my invention beyond the terms of the appended claims.

I claim:

1. In an upholstery construction, a base panel, a plurality of superimposed sheets of creped cellulosic material forming a pad and having secured to one face thereof a backing sheet, said superimposed sheets of creped cellulosic material being secured against displacement relative to each other by widely scattered indentations extending through the body of the pad formed by said sheets which indentations are substantially without lateral area, said backing sheet being secured to said base panel, and covering means extending over said pad and being overlapped over the edges of said base panel and secured thereto.

2. In an upholstery construction, a base panel, a plurality of superimposed sheets of creped cellulosic material forming a pad and having secured to one face thereof a backing sheet, said superimposed sheets of creped cellulosic material being secured against displacement relative to each other by widely scattered indentations extending through the body of the pad formed by said sheets which indentations are substantially without lateral area, covering means extending over said pad and being overlapped over the edges of said base panel and secured thereto, and stitching means extending through said pad and base panel to secure said pad to said base panel and to present an ornamented upholstered surface.

ERNEST KLOPFER HUNT.